United States Patent [19]

Hovind

[11] 3,864,993
[45] Feb. 11, 1975

[54] FILM RETRIEVER
[75] Inventor: Gary L. Hovind, Menominie, Wis.
[73] Assignee: Minnesota Mining and Manufacturing Company, St. Paul, Minn.
[22] Filed: Apr. 4, 1974
[21] Appl. No.: 457,783

[52] U.S. Cl. ................................ 81/3 R, 15/104 A
[51] Int. Cl. ........................................... B25b 27/00
[58] Field of Search ................. 81/3 R; 24/DIG. 11; 294/1 R, 1 A, 19 R; 15/104 A

[56] References Cited
UNITED STATES PATENTS
3,040,352  6/1962  Vian .................................. 15/104 A
3,261,237  7/1966  Semtiff ................................. 81/3 R Primary Examiner—Al Lawrence Smith
Assistant Examiner—Roscoe V. Parker
Attorney, Agent, or Firm—Alexander, Sell, Steldt & DeLaHunt

[57] ABSTRACT

A film retriever for retrieving the end of a convolutely wound film from the interior of a film cassette is formed from a thin flexible strip of material having a thickness of about 0.0015 to 0.006 inch. The strip is sufficiently flexible to conform easily to the internal diameter of the cassette, but has sufficient rigidity to allow the strip to be forced into a narrow exit opening of the cassette. Attached to one end of the strip is a thin layer of normally tacky pressure sensitive adhesive which has sufficient integrity to resist gumming and rolling when inserted through the exit opening of the cassette and has sufficient tack to pull the end of the film through the exit opening of the cassette.

4 Claims, 3 Drawing Figures

PATENTED FEB 11 1975 3,864,993

FILM RETRIEVER

BACKGROUND OF THE INVENTION

1. Field Of The Invention

This invention relates to a film retrieval device.

2. Description Of The Prior Art

When using convolutely wound film from a cassette, the exposed film is rewound into the cassette and the free end used in loading the camera is also wound into the cassette. While convenient for storage this represents a severe problem when it is desired to unwind the film from the cassette since the free end of the film cannot be grasped. Generally, the cassette is opened, such as by forcing the ends off the cassette and the film taken out as a convolutely wound roll. The roll of film can then be unwound and the exposed film placed into a developing device. There is presently no way to retrieve the free end of film from inside the cassette without opening the cassette.

The need for a sure, quick, inexpensive device which can be inserted into the cassette to grasp the free end of the film and pull it out of the cassette, without removing the ends of the cassette or otherwise forcing the cassette open resulting in exposure of the film, has been long felt.

BRIEF SUMMARY OF THE INVENTION

The film retriever of this invention provides a simple, inexpensive device suitable for retrieving the free end of a convolutely wound roll of film from inside of a sealed cassette via the exit opening of the cylindrical wall of the cassette. The retriever of this device comprises a thin flexible strip of material from about 0.0015 to 0.006 of an inch in thickness and being sufficiently flexible to conform to the internal diameter of the cassette. The strip has sufficient rigidity to allow the strip to be forced into the exit opening past the material forming the light trap for the cassette. A thin layer of normally tacky pressure sensitive adhesive (having a tack of at least 50 ounces per inch of width and being about 3 to 10 mils in thickness) is disposed on the end of the strip to be inserted into the cassette. The adhesive will have sufficient structural integrity to resist gumming and rolling when inserted into the cassette and has sufficient tack to grasp and hold the free end of the convolutely wound film as the film retriever is withdrawn through the exit opening.

DETAILED DESCRIPTION OF THE PREFERRED EMBODIMENTS

Figure 1:
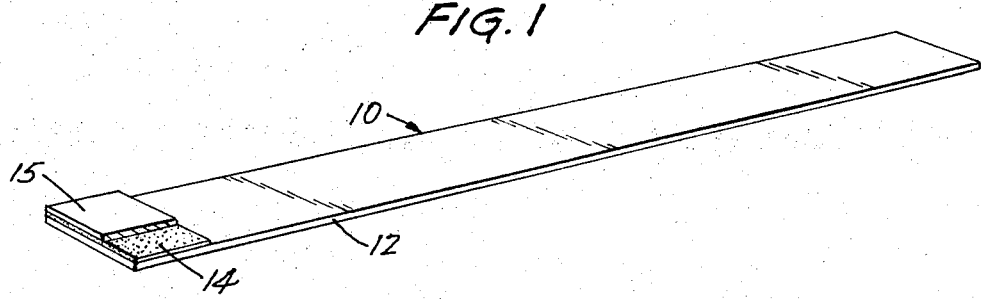
FIG. 1 is a perspective view in partial section of one embodiment of this invention.
Figure 2:
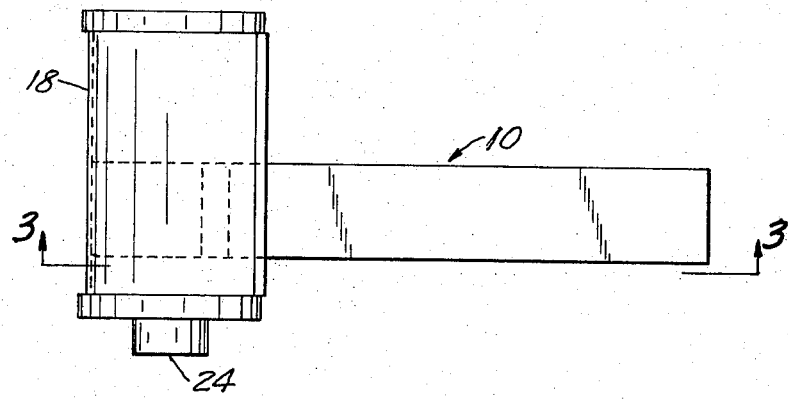
FIG. 2 is a top view of a film cassette with the film wound into the cassette and the film retriever of FIG. 1 inserted into the cassette.
Figure 3:
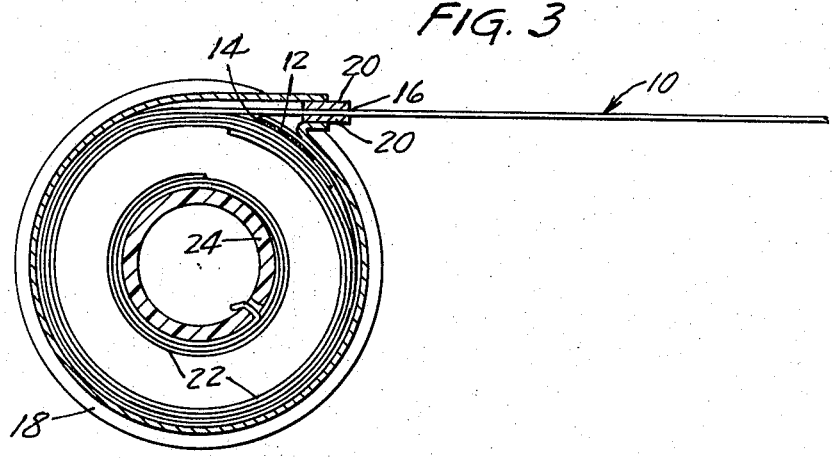
FIG. 3 is a cross-sectional view of FIG. 2 taken along the line 3—3.

Referring to the accompanying drawing wherein like reference numerals refer to like parts in the several views, a film retriever 10 is shown comprising a flat strip of material 12 having a layer of normally tacky adhesive 14 disposed along a length of said strip adjacent one end thereof. The adhesive 14 will generally have a protective covering 15 such as a silicone treated paper or other release liner material, such liner materials being well known in the pressure sensitive adhesive tape and adhesive arts.

The flexible strip 12 will generally be about 0.0015–0.006 inch thick which is sufficiently thin that with adhesive 14 the combination passes easily through an exit opening 16 in the side of the cassette 18 such openings normally being on the order of 0.012 to 0.045 inch and having light trap material 20 disposed on each face of the opening. The strip 12 is made of material having sufficient strength that the retriever 10 can be pushed through exit 20, past light trap material 20 and into the cassette 18 without substantial bending or breaking. Despite being strong enough to be pushed through opening 16 into the cassette 18, the strip 12 must be flexible enough to conform readily to the cylindrical interior wall surface of the cassette.

One measurement of a strip's flexibility and strength is the flexural modulus (bending modulus). The flexural modulus $F_m$ is defined as $EXI$, where $E$ is the modulus of elasticity and $I$ is the moment of inertia (a function of the thickness cubed). The materials useful in the practice of this invention generally have a flexural modulus of about 0.006 to 0.040 pounds force-square inch, such materials having both the required strength and the required flexibility for the practice of this invention. Examples of materials having flexural rigidity within the limits of this invention include metals, e.g., steel and plastics, e.g., polycarbonates. The preferred material is cold rolled steel shim stock which is available in a variety of thicknesses and widths. Thicknesses of about 0.0015–0.006 inch make acceptable film retrievers with thicknesses of 0.003–0.005 inch being preferred. The width of the materials will be less than the width of opening 16 (about 1.3 inches) and generally wider than about 1/8 inch for 35 mm. cassettes.

The adhesive will generally be applied in a thickness of about 3 to 10 mils. Like the strip material the thickness of adhesives will be such that the strip and adhesive can pass through the exit opening of the cassette and return from the cassette with the film. In order for the film retriever to work properly the adhesive will generally have an average track value of 50 pounds per inch of width when measured using Federal Test Methods Standards No. 147 which is the average value of the adhesion of the adhesive tested to steel using a 1 inch wide strip of adhesive. The values generated by this test represent average values from a plurality of tests but pressure sensitive adhesive which meets this criteria will form acceptable film retrievers. Of course the adhesive can be considerably stronger, adhesives having a tack value of 100 ounces per inch of width and greater being useful in the practice of this invention.

The adhesive will have sufficient structural integrity and adhesion for the strip that it does not ball up or gum up when the film retriever is forced through the exit opening 16 and will have sufficient tack to firmly grip the end of the film during its withdrawal through the light trap material 20. In order to give the adhesive increased structural integrity, it can be mounted on a thin layer of paper or polymeric film, the film and adhesive being attached to the flexible strip. One example of suitable adhesive materials is double sided adhesive tapes which have adhesive on both sides of a carrier stubtrate.

In operation, the film retriever 10 of this invention is inserted into the cassette 18 via the gap 16 between lips 20 with the adhesive 14 facing the inside of the cassette. The film retriever 10 is pushed inward until the retriever has moved a substantial portion of the way around the interior of the cassette with the flexible strip 12 conforming to the internal surface of the cylindrical wall of the cassette. After the film retriever 10 is inserted, convolutely wound film 22 is rotated inside the cassette 18 such as by rotating shaft 24 counterclockwise by hand. The free end of film 22 will contact the adhesive portion 14 and stick thereto after which the film retriever is firmly but gently withdrawn from the cassette 18 pulling the free end of the film out through the exit opening 16 between lips 20.

In the alternative the film retriever can be inserted into the cassette as described before and pushed around the interior of the cassette until the adhesive end is near the entrance 16. The retriever can then normally be withdrawn to bring the film out.

I claim:

1. A film retriever suitable for retrieving a free end of a convolutely wound film from inside a cylindrical cassette via an exit opening in said cassette edge wall comprising:

a thin flexible strip of material being from about 0.0015 to 0.006 inch in thickness, said material being sufficiently flexible to conform to the internal wall of the cassette but being sufficiently rigid to allow the strip to be forced into the cassette; and a thin layer of normally tacky pressure sensitive adhesive adjacent one end of said flexible strip, said layer being about 3 to 10 mils thick and having sufficient structural integrity to resist gumming and rolling when inserted into the cassette and being sufficiently adherent to pull the end of the film through the exit opening in said cassette.

2. The film retriever of claim 1 where said flexible strip has a flexural modulus of about 0.006 to 0.040 pound force-square inch.

3. The film retriever of claim 1 where said adhesive has a tack of at least 50 pounds per inch of width using the Federal Test Methods Standard No. 147.

4. The film retriever of claim 1 where said thin flexible strip is steel shim stock.

* * * * *